United States Patent
Su et al.

(10) Patent No.: US 10,492,238 B2
(45) Date of Patent: Nov. 26, 2019

(54) REMOTE CONTROLLER AND PARING METHOD THEREOF

(71) Applicant: Uniband Electronic Corp., Hsinchu (TW)

(72) Inventors: Huan-Ping Su, Hsinchu (TW); Chien-Hsin Su, Hsinchu (TW); Shih-Tsun Lai, Miaoli (TW); Chien-Shuo Li, Nantou (TW); Wei-Hao Chen, Hsinchu (TW); Jia-Woei Jean, Taipei (TW); Chih-Yuan Su, Taipei (TW)

(73) Assignee: Uniband Electronic Corp., Hsin-Chu (TW)

( * ) Notice: Subject to any disclaimer, the term of this patent is extended or adjusted under 35 U.S.C. 154(b) by 48 days.

(21) Appl. No.: 15/915,472

(22) Filed: Mar. 8, 2018

(65) Prior Publication Data
US 2019/0281642 A1 Sep. 12, 2019

(51) Int. Cl.
*H04W 76/14* (2018.01)
(52) U.S. Cl.
CPC ........ *H04W 76/14* (2018.02); *G08C 2201/20* (2013.01); *G08C 2201/40* (2013.01)
(58) Field of Classification Search
CPC ............ G08C 2201/40; G08C 2201/42; G08C 2201/20–21; H04W 76/14
See application file for complete search history.

(56) References Cited

U.S. PATENT DOCUMENTS

| | | | | |
|---|---|---|---|---|
| 6,490,294 B1* | 12/2002 | Manzado | ............... | H04J 3/1623 370/389 |
| 2012/0075538 A1* | 3/2012 | Okuda | ................... | G08C 17/02 348/734 |
| 2016/0381143 A1* | 12/2016 | Malik | ................... | H04L 67/125 455/518 |

* cited by examiner

*Primary Examiner* — Kevin C. Harper
(74) *Attorney, Agent, or Firm* — Winston Hsu

(57) ABSTRACT

A remote controller comprises a wireless communication interface and a processing unit. The wireless communication interface is communicatively connected with another remote controller. The processing unit is electrically connected with the wireless communication interface. The processing unit generates a first identification code and a second identification code and transmits the first identification code and the second identification code to the another remote controller through the wireless communication interface. The another remote controller transmits the first identification code and the second identification code to a controlled device to establish an indirect pairing relationship between the remote controller and the controlled device and a direct pairing relationship between the another remote controller and the controlled device. A pairing method of remote controllers is also disclosed.

7 Claims, 4 Drawing Sheets

REMOTE CONTROLLER AND PARING METHOD THEREOF

BACKGROUND OF THE INVENTION

1. Field of the Invention

The present invention relates to a remote controller and a pairing method thereof, particularly to a remote controller and a pairing method, which can control all the controlled devices.

2. Description of the Prior Art

In the conventional illumination system, a one-to-one or one-to-multiple pairing relationship exists between a remote controller and at least one illumination device, whereby to control the illumination system through wireless communication. In an illumination system for larger space, multiple remote controllers are paired with multiple illumination devices to form a multiple-to-multiple pairing relationship for controlling the illumination devices section by section, similar to the conventional switch set on the wall. Thus, multitudinous remote controllers are used to control multitudinous illumination devices. Suppose one remote controller can control two lightbulbs. Thus, four remote controllers are needed to control eight light bulbs.

The inconvenience that the user cannot simultaneously control all illumination devices in a single operation leads to operational inefficiency of the illumination system.

Therefore, a remote controller and a paring method thereof able to control all the controlled devices become targets the manufacturers are eager to achieve.

SUMMARY OF THE INVENTION

The present invention provides a remote controller and a pairing method thereof, which use a first remote controller to generate a first identification code and a second identification code and transmit the first identification code and the second identification code to one of a plurality of second remote controllers. The second remote controller transmits the first identification code and the second identification code to a controlled device to establish an indirect pairing relationship between the first remote controller and the controlled device and a direct pairing relationship between the second remote controller and the controlled device, whereby to form a multi-level remote control system. Thereby, the first remote controller can transmit a remote control instruction to control all the controlled devices in a single operation.

In one embodiment, the remote controller of the present invention comprises a wireless communication interface and a processing unit and functions as a first remote controller. The remote controller is communicatively connected with a second remote controller through the wireless communication interface. The processing unit is electrically connected with the wireless communication interface, generating a first identification code and a second identification code and transmitting the first identification code and the second identification code to the second remote controller through the wireless communication interface. The second remote controller transmits the first identification code and the second identification code to a controlled device to establish an indirect pairing relationship between the remote controller and the controlled device and a direct pairing relationship between the second remote controller and the controlled device.

In one embodiment, the remote controller of the present invention comprises a wireless communication interface and a processing unit and functions as a second remote controller. The remote controller is selectively communicatively connected with a first remote controller or a controlled device. The processing unit is electrically connected with the wireless communication interface, receiving a first identification code and a second identification code generated by the first remote controller through the wireless communication interface and transmitting the first identification code and the second identification code to the controlled device to establish an indirect pairing relationship between the first remote controller and the controlled device and a direct pairing relationship between the remote controller and the controlled device.

In one embodiment, the pairing method of remote controllers comprises steps: providing a remote controller functioning as a first remote controller, which is communicatively connected with a second remote controller; the remote controller generating a first identification code and a second identification code; the remote controller transmitting the first identification code and the second identification code to the second remote controller; the second remote controller receiving the first identification code and the second identification code; and the second remote controller transmitting the first identification code and the second identification code to a controlled device to establish an indirect pairing relationship between the remote controller and the controlled device and a direct pairing relationship between the second remote controller and the controlled device.

In one embodiment, the pairing method of remote controllers comprises steps: providing a remote controller functioning as a second remote controller, which is communicatively connected with a first remote controller; the remote controller receiving a first identification code and a second identification code generated by the first remote controller; and the remote controller communicatively connecting with a controlled device and transmitting the first identification code and the second identification code to the controlled device to establish an indirect pairing relationship between the first remote controller and the controlled device and a direct pairing relationship between the remote controller and the controlled device.

Below, embodiments are described in detail in cooperation with the attached drawings to make easily understood the objectives, technical contents, characteristics and accomplishments of the present invention.

DESCRIPTION OF THE PREFERRED EMBODIMENTS

Figure 1:
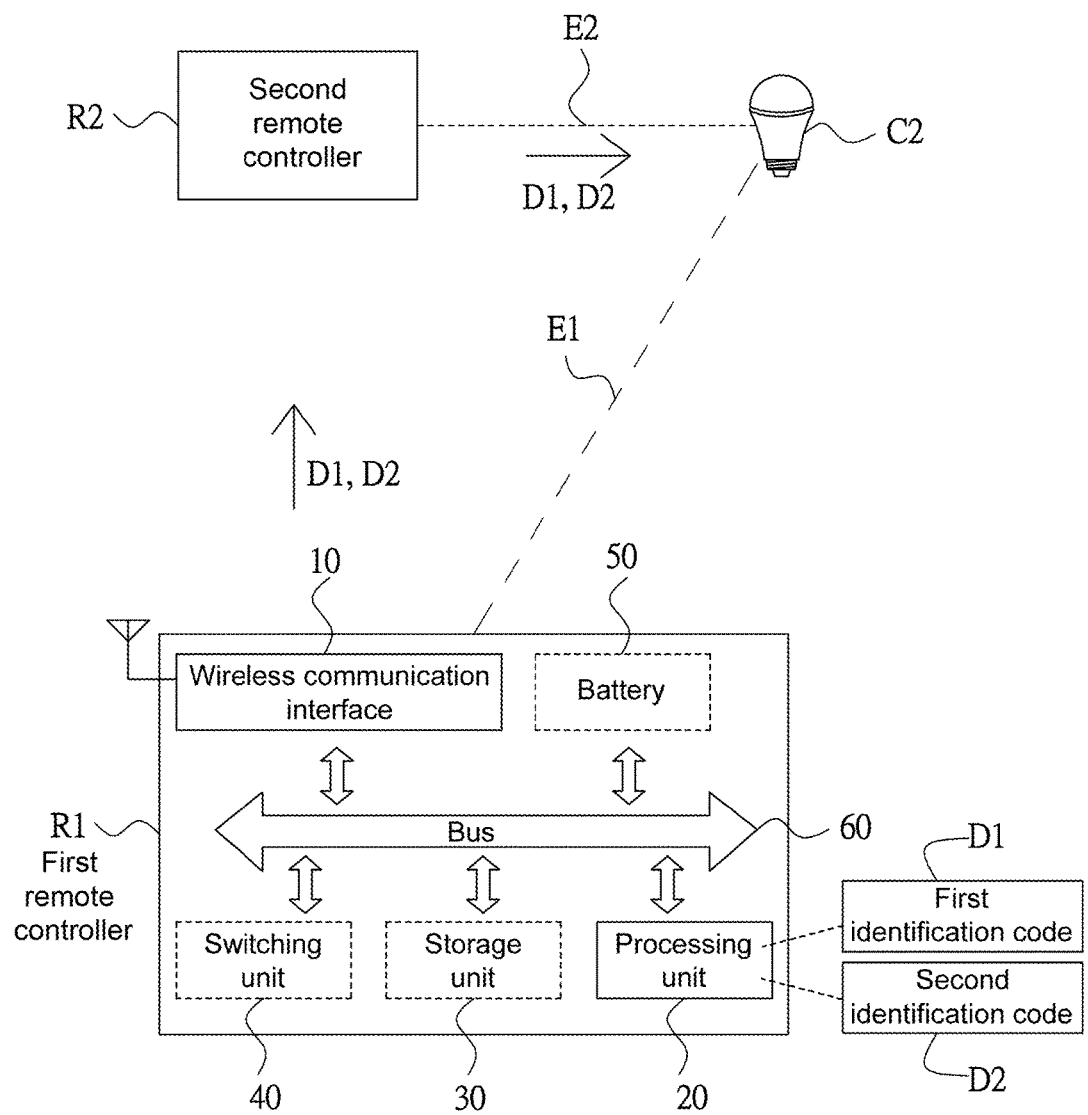
FIG. 1 is a diagram schematically showing a remote controller according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

In the conventional technology, the remote controller and the controlled device use wireless communication to recognize each other and transmit identification codes to each other to establish a pairing relationship. For example, a remote controller transmits a controlling-side identification code to an illumination device (i.e. a controlled device), and the controlled device transmits a controlled-side identification code to the remote controller; the remote controller and the illumination device respectively store the identification codes of the opposite sides to establish a direct pairing relationship.

In one embodiment, the remote controller and the pairing method of the present invention use a first remote controller to generate identification codes and transmit the identification codes unidirectionally to a second remote controller; the second remote controller then transmits the identification codes to a controlled device to establish an indirect pairing relationship between the first remote controller and the controlled device. The working principle thereof is described in detail below.

Figure 2:
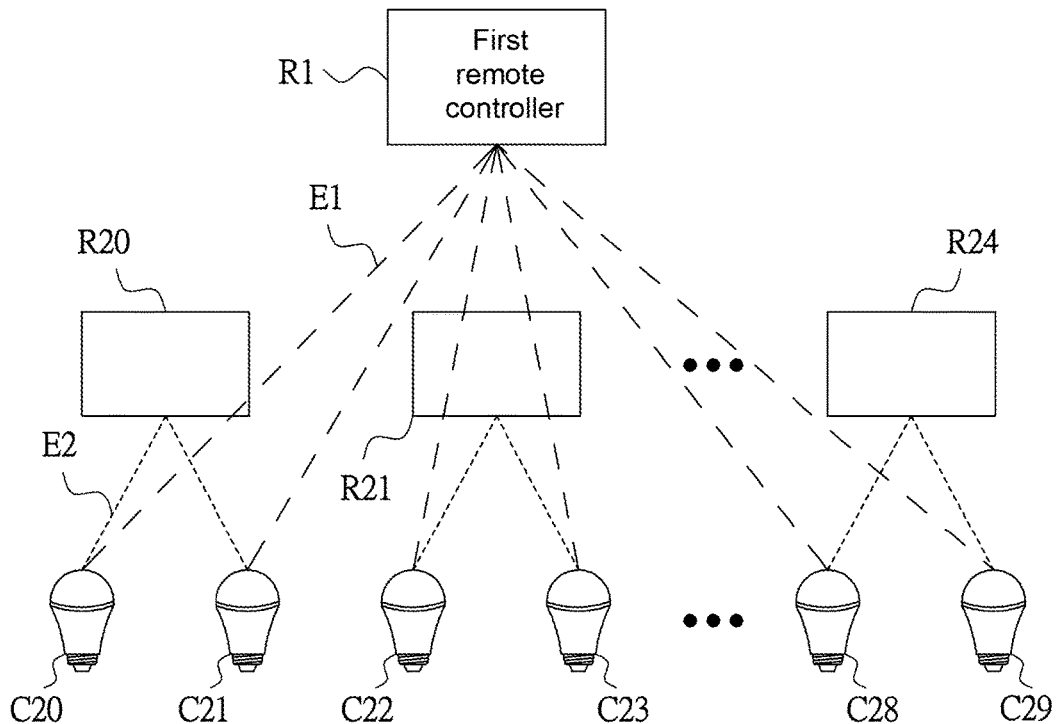
FIG. 2 is a diagram schematically showing a multi-level remote controller according to one embodiment of the present invention.

Refer to FIG. 1 and FIG. 2. In one embodiment, a first remote controller R1 comprises a wireless communication interface 10, a processing unit 20, a battery 50 and a bus 60. The first remote controller R1 is communicatively connected with a second remote controller R2 to establish a multi-level remote control system. In this embodiment, the wireless communication interface 10 and the processing unit 20 are electrically connected with each other through the bus 60. However, the present invention does not limit that the wireless communication interface 10 and the processing unit 20 must be electrically connected with each other through the bus 60. The battery 50 is disposed inside the first remote controller R1 to provide electric power for the first remote controller R1. In other words, the remote controller R1 is a lightweight, mobile, and easy-to-carry controller, distinct from the conventional gateway.

The first remote controller R1 is communicatively connected with the second remote controller R2 through the wireless communication interface 10 according to a wireless communication protocol, such as Zigbee (IEEE 802.15.4), Bluetooth (IEEE 802.15.1), WLAN (IEEE 802.11), or Radio Frequency. However, the present invention does not limit that the first remote controller must be communicatively connected with the second remote controller according to the abovementioned wireless communication protocol. In one embodiment, the second remote controller R2 sends a beacon request to the first remote controller R1; after receiving the beacon request, the first remote controller R1 sends a beacon to the second remote controller R2, whereby to establish a communication link. Thus, the first remote controller R1 can recognize whether the communication object is the second remote controller R2 or the controlled device C2 and then undertake the corresponding pairing process.

In one embodiment, the communication object of the first remote controller R1 is the second remote controller R2. Thus, the processing unit 20 generates a first identification code D1 and a second identification code D2, wherein the first identification code D1 represents the first remote controller R1 and the second identification code D2 represents the second remote controller R2. In other words, the identification code for the second remote controller R2 is not generated by the second remote controller R2 itself but generated/assigned by the first remote controller R1. In one embodiment, the first remote controller R1 further comprises a storage unit 30; the storage unit 30 is electrically connected with the processing unit 20 and stores the first identification code D1 and the second identification code D2; the processing unit 20 transmits the first identification code D1 and the second identification code D2 to the second remote controller R2 through the communication interface 10. It should be noted: In the present invention, the first remote controller R1 generates the abovementioned identification codes and transmits them to the second remote controller R2 unidirectionally; the second remote controller R2 neither generates its own identification code nor transmits the identification code thereof to the first remote controller R1. Therefore, the pairing method of the present invention is distinct from the conventional technology.

Next, the second remote controller R2 transmits the first identification code D1 and the second identification code D2 to a controlled device C2, and the controlled device C2 stores the first identification code D1 and the second identification code D2. Thus, a first pairing relationship E1 is established between the first remote controller R1 and the controlled device C2, wherein the first pairing relationship E1 is an indirect pairing relationship between the first remote controller R1 and the controlled device C2; a second pairing relationship E2 is established between the second remote controller R2 and the controlled device C2, wherein the second pairing relationship E2 is a direct pairing relationship between the second remote controller R2 and the controlled device C2. In one embodiment, the controlled device C2 is an illumination device. However, the present invention does not limit that the controlled device C2 must be an illumination device.

Refer to FIG. 2. In the paired multi-level remote control system, if a controlled device C20 receives a remote control instruction, the controlled device C20 would analyze which one of the first identification code D1 and the second identification code D2 the remote control instruction contains to determine which one of the first remote controller R1 and the second remote controller R20 the remote control instruction comes from and then executes the remote control instruction. In other words, both the first remote controller R1 and the second remote controller R20 can directly transmit remote control instructions to the controlled device C20 to directly control the controlled device C20 respectively through the first pairing relationship E1 and the second pairing relationship E2. In the multi-level remote control system, the first remote controller R1 can transmit a remote control instruction to all the controlled devices C20-C29 and control all the controlled devices C20-C29 in a single operation.

Suppose that the plurality of controlled devices C20-C29 is a plurality of illumination devices installed in different areas of an office building and that the plurality of second remote controllers R20-R24 is a plurality of second remote controllers respectively disposed in the abovementioned different areas and used to control the illumination devices in the different areas. For example, the second remote controller R20 can turn on/off the illumination devices C20 and C21; the second remote controller R21 can turn on/off the illumination devices C22 and C23. However, the second remote controller R20 is unlikely to control the illumination devices C22-C29 in the other areas. The other second remote controllers would also experience the like scenario. If the persons in different areas of the office building respectively get off duty at different times, they may respectively use the corresponding second remote controllers to turn off the corresponding illumination devices. However, in the present invention, the administrator of the building or the person leaving the building last needn't operate the second remote controllers R20-R24 one by one but can use the first remote controller R1 to turn off all the illumination devices C20-C29 in a single operation. Therefore, the present invention can effectively increase the efficiency of administrating the illumination devices of a building.

Figure 3:
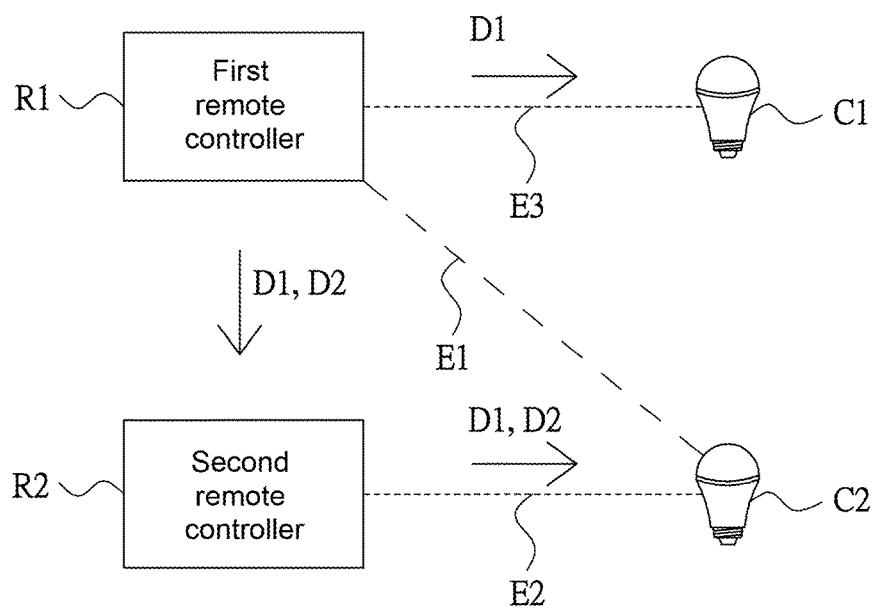
FIG. 3 is a diagram schematically showing a multi-level remote controller according to another embodiment of the present invention.

Refer to FIG. 3. In one embodiment, the processing unit of the first remote controller R1 can directly transmit the first identification code D1 to another controlled device C1 through the wireless communication interface, exempted from using the second remote controller R2 to retransmit the first identification code D1 to the controlled device C1. The first pairing relationship E1 may be established between the first remote controller R1 and the controlled devices C2. In other words, the first remote controller R1 may have an indirect pairing relationship with the controlled device C2 through the second remote controller R2. Alternatively, a third pairing relationship E3 (i.e. a direct pairing relationship) is directly established between the first remote controller R1 and another controlled device C1. It should be further explained: In the embodiment of the multi-level remote control system shown in FIG. 3, the first remote controller R1 and the controlled device C1 belong to the first level, and the second remote controller R2 and the controlled device C2 belong to the second level.

Refer to FIG. 1 again. In the present invention, the first remote controller R1 may function as the second remote controller R2 selectively. In one embodiment, the first remote controller R1 further comprises a switching unit 40. The user may use the switching unit 40 to switch the first remote controller R1 to function as the second remote controller R2. In such a case, the first remote controller R1 does not generate any identification code but communicatively connects with another first remote controller though the wireless communication interface 10 to receive another first identification code D1 and another second identification code D2 generated by another first remote controller. Next, the first remote controller R1 is communicatively connected with the controlled device C2 through the communication interface 10 and transmits another first identification code D1 and another second identification code D2 to the controlled device C2. Thereby, the first remote controller R1 can function as the second remote controller R2. In one embodiment, the switching unit 40 includes a press button, a finger-operated switch or a touch control panel. However, the present invention is not limited by the abovementioned embodiment.

Refer to FIG. 1 again. In one embodiment, the second remote controller R2 comprises a wireless communication interface, a processing unit, a battery and a bus (not shown in the drawings). The components of the second remote controller R2 are the same as those of the first remote controller R1. Therefore, the structural characteristics and embodiments thereof will not repeat herein. It is further explained herein: the processing unit of the second remote controller R2 does not generate any identification code but communicatively connects with the first remote controller R1 through the wireless communication interface to receive the first identification code D1 and the second identification code D2 generated by the first remote controller R1. In one embodiment, the second remote controller R2 further comprises a storage unit; the storage unit is electrically connected with the processing unit and stores the first identification code and the second identification code.

Next, the processing unit of the second remote controller R2 is communicatively connected with a controller device C2 through the wireless communication interface and transmits the first identification code D1 and the second identification code D2 to the controlled device C2. Next, the controlled device C2 stores the first identification code D1 and the second identification code D2. In other words, the wireless communication interface selectively connects with the first remote controller R1 or the controlled device C2 to facilitate one of the abovementioned pairing processes. Thereby, a first pairing relationship E1 is established between the first remote controller R1 and the controlled device C2, wherein the first pairing relationship E1 is an indirect pairing relationship between the first remote controller R1 and the controlled device C2; a second pairing relationship E2 is established between the second remote controller R2 and the controlled device C2, wherein the second pairing relationship E2 is a direct pairing relationship between the second remote controller R2 and the controlled device C2. In one embodiment, the controlled device C2 is an illumination device.

Similarly, the second remote controller R2 may function as the first remote controller R1. In one embodiment, the second remote controller R2 further comprises a switching unit. The user may operate the switching unit to switch the second remote controller R2 into a first remote controller R1. In such a case, the processing unit of the remote controller generates a first identification code D1 and a second identification code D2 and transmits the first identification code D1 and the second identification code D2 to another second remote controller through the wireless communication interface. In such a case, the second remote controller R2 is used as a first remote controller R1. In one embodiment, the switching unit 40 includes a press button, a finger-operated switch or a touch control panel. However, the present invention is not limited by the abovementioned embodiment.

Figure 4:
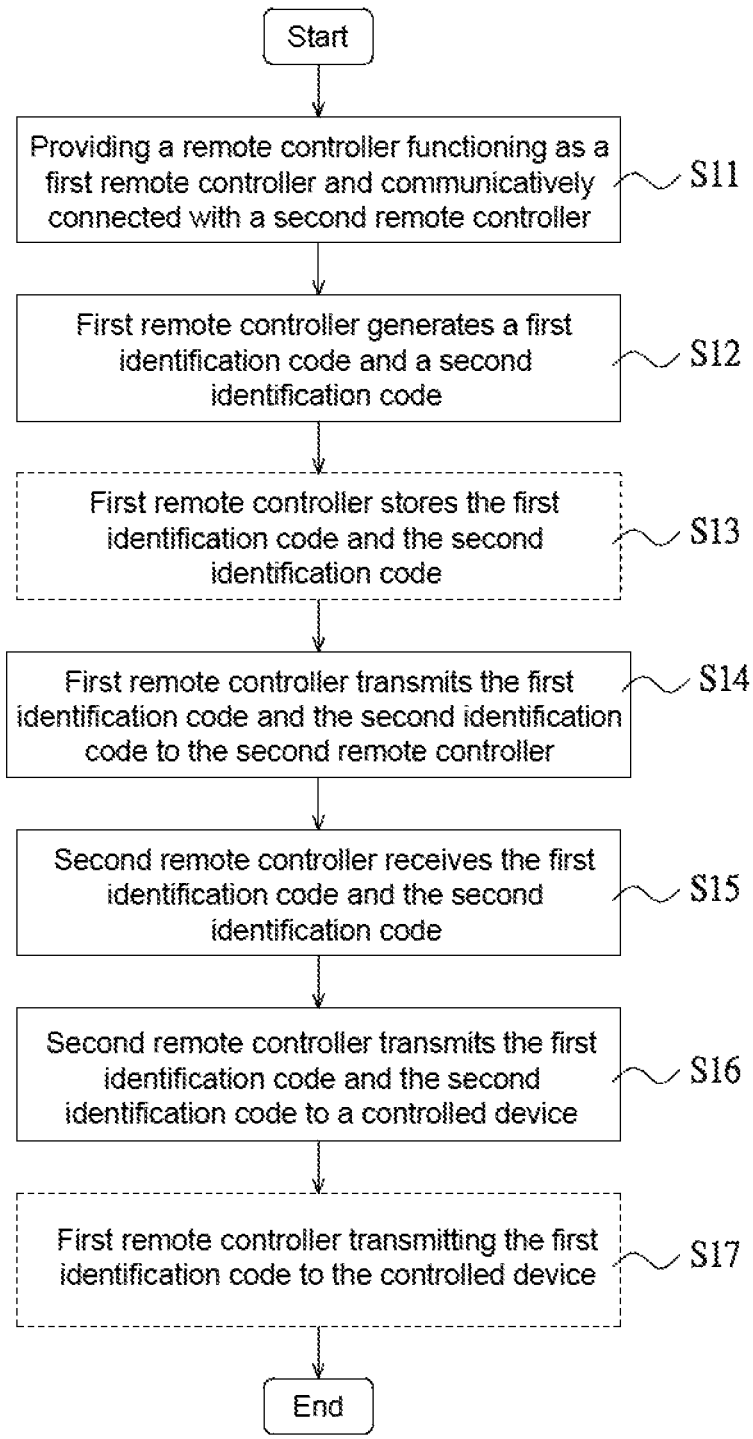
FIG. 4 is a flowchart of a pairing method of remote controllers according to one embodiment of the present invention.

Refer to FIG. 1 and FIG. 4. Below is described the pairing method of the first remote controller according to one embodiment of the present invention. The pairing method of the first remote controller comprises Steps S11-S17. In Step S11, provide a remote controller functioning as a first remote controller R1 and communicatively connected with a second remote controller R2. In Step S12, the first remote controller R1 generates a first identification code D1 and a second identification code D2. In Step S13, the first remote controller R1 stores the first identification code D1 and the second identification code D2.

In Step S14, the first remote controller R1 transmits the first identification code D1 and the second identification code D2 to the second remote controller R2. In Step S15, the second remote controller R2 receives the first identification code D1 and the second identification code D2.

In Step S16, the second remote controller R2 transmits the first identification code D1 and the second identification code D2 to a controlled device C2. The controlled device C2 stores the first identification code D1 and the second identification code D2. Thereby, a first pairing relationship E1 is established between the first remote controller R1 and the controlled device C2, wherein the first pairing relationship E1 is an indirect pairing relationship between the first remote controller R1 and the controlled device C2; a second pairing relationship E2 is established between the second remote controller R2 and the controlled device C2, wherein the second pairing relationship E2 is a direct pairing relationship between the second remote controller R2 and the controlled device C2. In one embodiment, the controlled device C2 is an illumination device. The detailed pairing process of the first remote controller R1 and the controlled device C2 and the related embodiments thereof have been described before and will not repeat herein.

Refer to FIG. 3 and FIG. 4. In one embodiment, the first remote controller R1 directly transmits the first identification code D1 to the controlled device C1 of the first level of the multi-level remote control system. Therefore, the direct pairing relationship between the first remote controller R1 and the controlled devices C1 can be established without using the second remote controller R2. In Step S17, the first remote controller R1 transmits the first identification code D1 to the controlled devices C1, whereby a third pairing relationship E3 between the first remote controller R1 and the controlled device C1 can be established.

Figure 5:
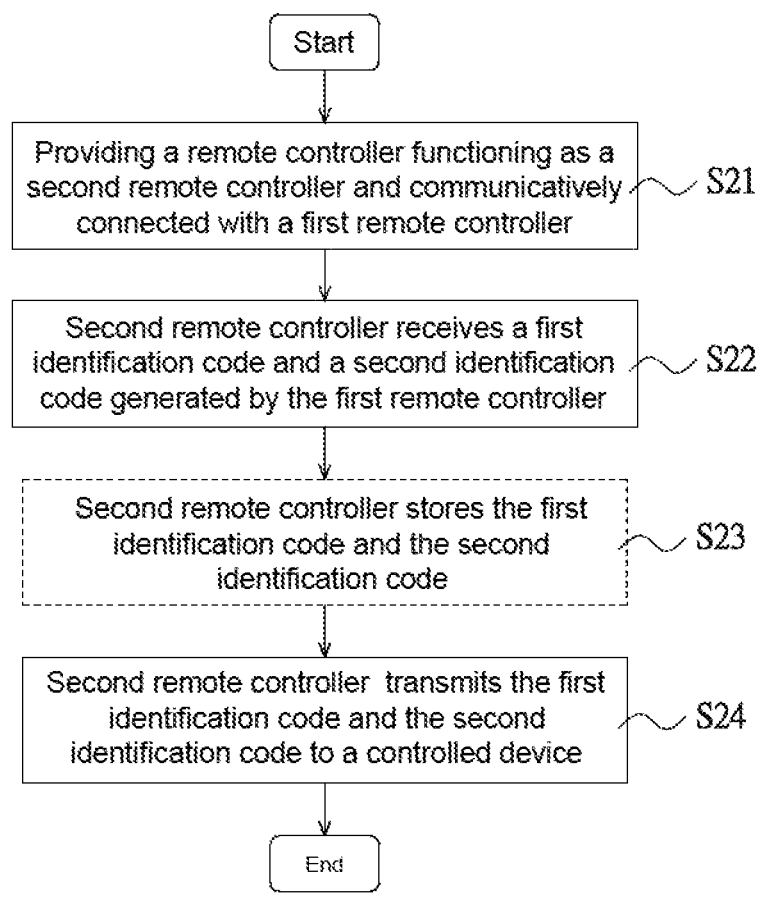
FIG. 5 is a flowchart of a pairing method of remote controllers according to another embodiment of the present invention.

Refer to FIG. 1 and FIG. 5. Below is described the pairing method of the second remote controller according to one embodiment of the present invention. The pairing method of the second remote controller comprises Steps S21-S24. In Step S21, provide a remote controller functioning as a second remote controller R2 and communicatively connected with a first remote controller R1. In Step S22, the second remote controller R2 receives a first identification code D1 and a second identification code D2 generated by the first remote controller R1. In Step S23, the second remote controller R2 stores the first identification code D1 and the second identification code D2.

In Step S24, the second remote controller R2 communicatively connects with the controlled device C2 and transmits the first identification code D1 and the second identification code D2 to a controlled device C2. Thereby, a first pairing relationship E1 is established between the first remote controller R1 and the controlled device C2, wherein the first pairing relationship E1 is an indirect pairing relationship between the first remote controller R1 and the controlled device C2; a second pairing relationship E2 is established between the second remote controller R2 and the controlled device C2, wherein the second pairing relationship E2 is a direct pairing relationship between the second remote controller R2 and the controlled device C2. In one embodiment, the controlled device C2 is an illumination device. However, the present invention is not limited by the abovementioned embodiment. The detailed pairing process of the second remote controller R2 and the controlled device C2 and the related embodiments thereof have been described before and will not repeat herein.

In conclusion, the remote controller and the pairing method thereof use a first remote controller to generate a first identification code and a second identification code and transmit the first identification code and the second identification code to one of a plurality of second remote controller. The second remote controller further transmits the identification codes to controlled devices to establish an indirect pairing relationship between the first remote controller and the controlled devices, whereby to form a multi-level remote control system. If the pairing relationships between the controlled devices, the first remote controller and the second remote controllers have been established and the controlled device receives a remote control instruction, the controlled device can identify which one of the first remote controller and the second remote controller the remote control instruction comes from and execute the remote control instruction. In the multi-level remote control system of the present invention, each of the first and second remote controllers can send out a remote control instruction to directly control the controlled devices through the indirect or direct pairing relationship. After the pairing relationships have been established, the first remote controller can send out a remote control instruction to simultaneously control all the controlled devices in a single operation. Thus, the user can administrate the illumination system of the office building conveniently. Therefore, the present invention can effectively enhance the efficiency of office building administration.

The embodiments have been described above to demonstrate the technical thoughts and characteristics of the present invention to enable the persons skilled in the art to understand, make, and use the present invention. However, these embodiments are only to exemplify the present invention but not to limit the scope of the present invention. Any equivalent modification or variation according to the spirit of the present invention is to be also included by the scope of the present invention.

What is claimed is:

1. A pairing method of remote controllers, comprising steps:
   providing a remote controller functioning as a first remote controller and communicatively connected with a second remote controller;
   the first remote controller generating a first identification code and a second identification code;
   the first remote controller transmitting the first identification code and the second identification code to the second remote controller;
   the second remote controller receiving the first identification code and the second identification code; and
   the second remote controller transmitting the first identification code and the second identification code to a controlled device to establish an indirect pairing relationship between the first remote controller and the controlled device and a direct pairing relationship between the second remote controller and the controlled device.

2. The pairing method of remote controllers according to claim 1,
   wherein the first remote controller transmits the first identification code to the controlled device to establish a direct pairing relationship between the first remote controller and the controlled device.

3. The pairing method of remote controllers according to claim 1,
   wherein the controlled device is an illumination device.

4. The pairing method of remote controllers according to claim 1 further comprising a step:
   the first remote controller storing the first identification code and the second identification code.

5. A pairing method of remote controllers, comprising steps:
   providing a remote controller functioning as a second remote controller and communicatively connected with a first remote controller;
   the second remote controller receiving a first identification code and a second identification code generated by the first remote controller; and
   the second remote controller communicatively connected with a controlled device and transmitting the first identification code and the second identification code to the controlled device to establish an indirect pairing relationship between the first remote controller and the controlled device and a direct pairing relationship between the second remote controller and the controlled device.

6. The pairing method of remote controllers according to claim 5,
   wherein the controlled device is an illumination device.

7. The pairing method of remote controllers according to claim 5 further comprising a step:
   the second remote controller storing the first identification code and the second identification code.

* * * * *